(12) United States Patent
Smith et al.

(10) Patent No.: US 7,185,737 B2
(45) Date of Patent: Mar. 6, 2007

(54) ATV ACCESSORIES

(75) Inventors: David R. Smith, 540 23rd St. SW.,
Naples, FL (US) 34117; Suzzette G. Smith, Naples, FL (US)

(73) Assignee: David R. Smith, Bonifay, FL (US)

( * ) Notice: Subject to any disclaimer, the term of this patent is extended or adjusted under 35 U.S.C. 154(b) by 313 days.

(21) Appl. No.: 10/983,302

(22) Filed: Nov. 8, 2004

(65) Prior Publication Data

US 2006/0096806 A1 May 11, 2006

(51) Int. Cl.
*E06C 5/00* (2006.01)
*B60R 9/00* (2006.01)

(52) U.S. Cl. ........................ 182/127; 224/401; 414/462
(58) Field of Classification Search ................ 182/127, 182/63.1; 414/462; 224/401
See application file for complete search history.

(56) References Cited

U.S. PATENT DOCUMENTS

| 4,614,252 | A | * | 9/1986 | Tarner | 182/116 |
| 4,625,831 | A | * | 12/1986 | Rodgers, Jr. | 182/116 |
| 4,696,374 | A | * | 9/1987 | Hale | 182/127 |
| 5,409,081 | A | * | 4/1995 | Reeves | 182/63.1 |
| 6,105,721 | A | * | 8/2000 | Haynes | 182/127 |
| 6,739,428 | B1 | * | 5/2004 | Holmes et al. | 182/127 |
| 2002/0070255 | A1 | * | 6/2002 | Hebert et al. | 224/401 |
| 2005/0087576 | A1 | * | 4/2005 | Davis | 224/505 |

\* cited by examiner

*Primary Examiner*—Alvin Chin-Shue

(57) ABSTRACT

An ATV (All Terrain Vehicle) has an accessory supporting structure attached to a front thereof. The ATV has a forward grid-like shelf attached thereto and supported by the chassis of the vehicle. The accessory supporting structure has two vertical upstanding columns which are attached to the shelf at one point and the two vertical columns have horizontal and rearwardly extending horizontal rods attached thereto. The horizontal rods are to the chassis of the vehicle for rigidity and stability. The lower ends of the vertical support columns have a support platform extending in a forward manner as seen from the front of the vehicle. The platform is capable of carrying any items including a person. The platform can be used to carry collapsed segments of a climber stand. Another accessory structure to be carried is a ladder stand that is carried in a horizontal manner on the ATV.

4 Claims, 3 Drawing Sheets

ATV ACCESSORIES

CROSS REFERENCE TO RELATED APPLICATIONS (none)

STATEMENT REGARDING FED SPONSORED R & D (none)

BACKGROUND OF THE INVENTION

ATV's (All Terrain Vehicles) are known to carry various accessories such as ladders or disassembled hunting tree stands. Supports that handle tool boxes or support ice chests and other items. All of the above mentioned items need special ties such as ropes or wires so that these items can be tied to the vehicles for safe transport.

BRIEF DESCRIPTION OF THE INVENTION

The invention at hand takes advantage of the basic structure of an ATV. Most all ATV's have a built in horizontal shelf for receiving certain items. The shelf is made of various rods to thereby represent a grid-like structure. The inventive structure has added two left and right (seen from the front of the vehicle) columns that are fastened to the existing shelf. The columns continue downwardly and each has attached thereto at their bottoms thereof horizontal rods which continue rearwardly and are fastened to the chassis of the ATV and extensions from the shelf. The thus established frame work is used to accommodate various accessories as will be described below.

BRIEF DESCRIPTION OF HE DRAWINGS

DETAILED DESCRIPTION OF THE INVENTION

Figure 1:
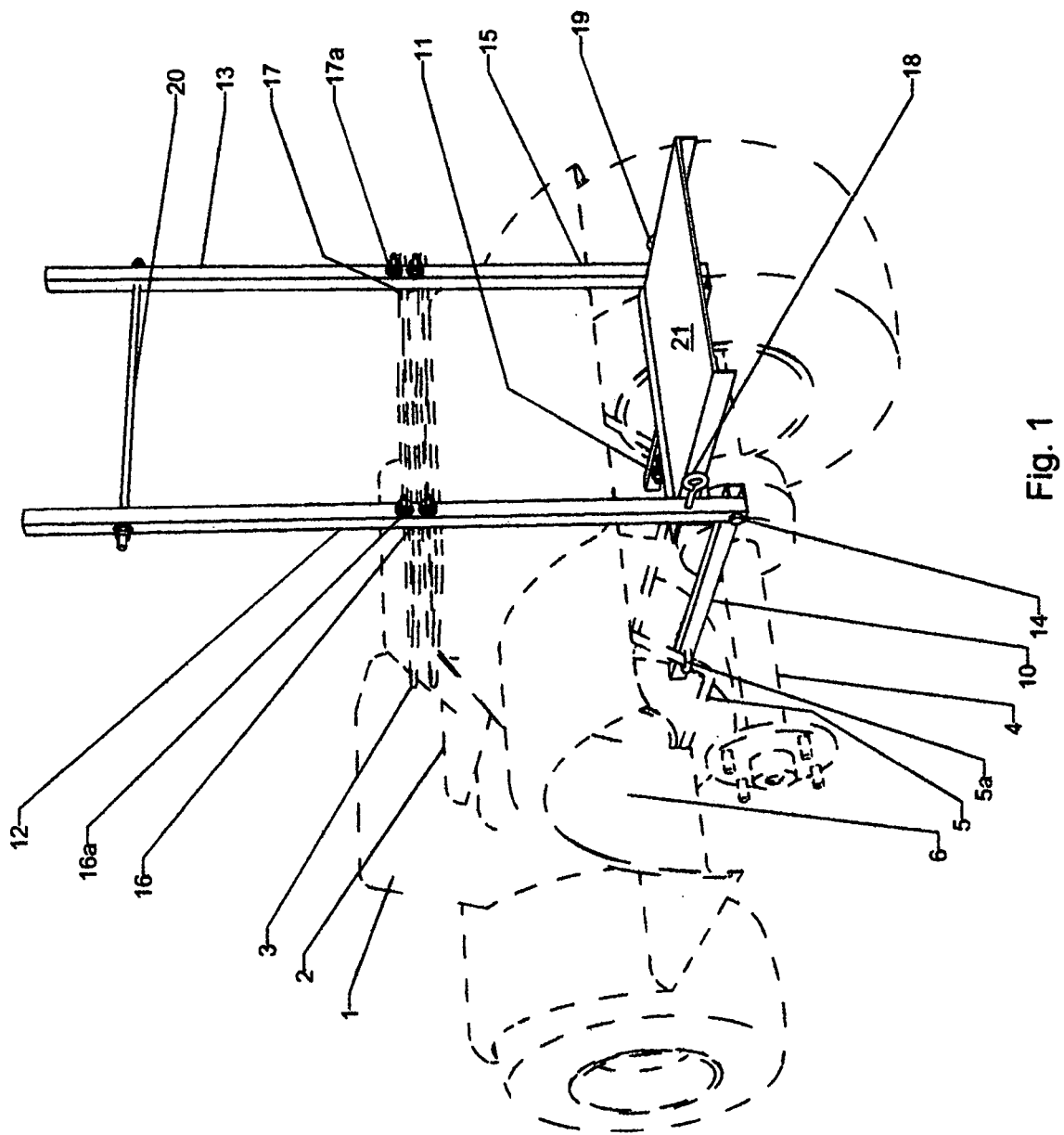
FIG. 1 illustrates the overall perspective combination of ATV and the accessory attached thereto.

FIG. 1 illustrates a framing combination attached to the basic frame of an ATV (All Terrain Vehicle). The basic frame of the ATV is shown at 1 in the form of a fender and having a saddle 2 incorporated into the ATV. The forward end of The ATV has a shelf 3 attached thereto. The shelf 3 normally supports any load that is to be used on a certain trip or endeavor. The shelf 3 itself consists of rods fastened to each other to form a grid. The inventive structure includes two vertical and upstanding columns 12 and 13 which are fastened to a forward rod of the supporting shelf 3 by way U-bolts 16 on the left and the U-bolts 17 on the right side of the frame as seen from the front of the vehicle. The U-bolts 16 and 17 are fastened by way of the nuts 16a and 17a, respectively. The upper ends of the upstanding rods 12 and 13 are held in a parallelism fashion by a treaded bolt 20 which at the same time contribute to the sturdiness and the rigidity of the frame. The lower ends of the upstanding columns 12 and 13 are fastened to horizontal rods 10 and 11 at one end thereof by way of fasteners 14 and 15, respectively. The other ends of the horizontal rods 10 and 11 are fastened to the support rod 5 of the shelf 3 by way U-bolts 5a. The outer and lower ends of the columns 12 and 13 receive eye bolts 18 and 19 which are useful to secure a load on the columns The threaded rod 20 is used when the distance between the upstanding columns 12 and 13 is to be changed.

Figure 2:
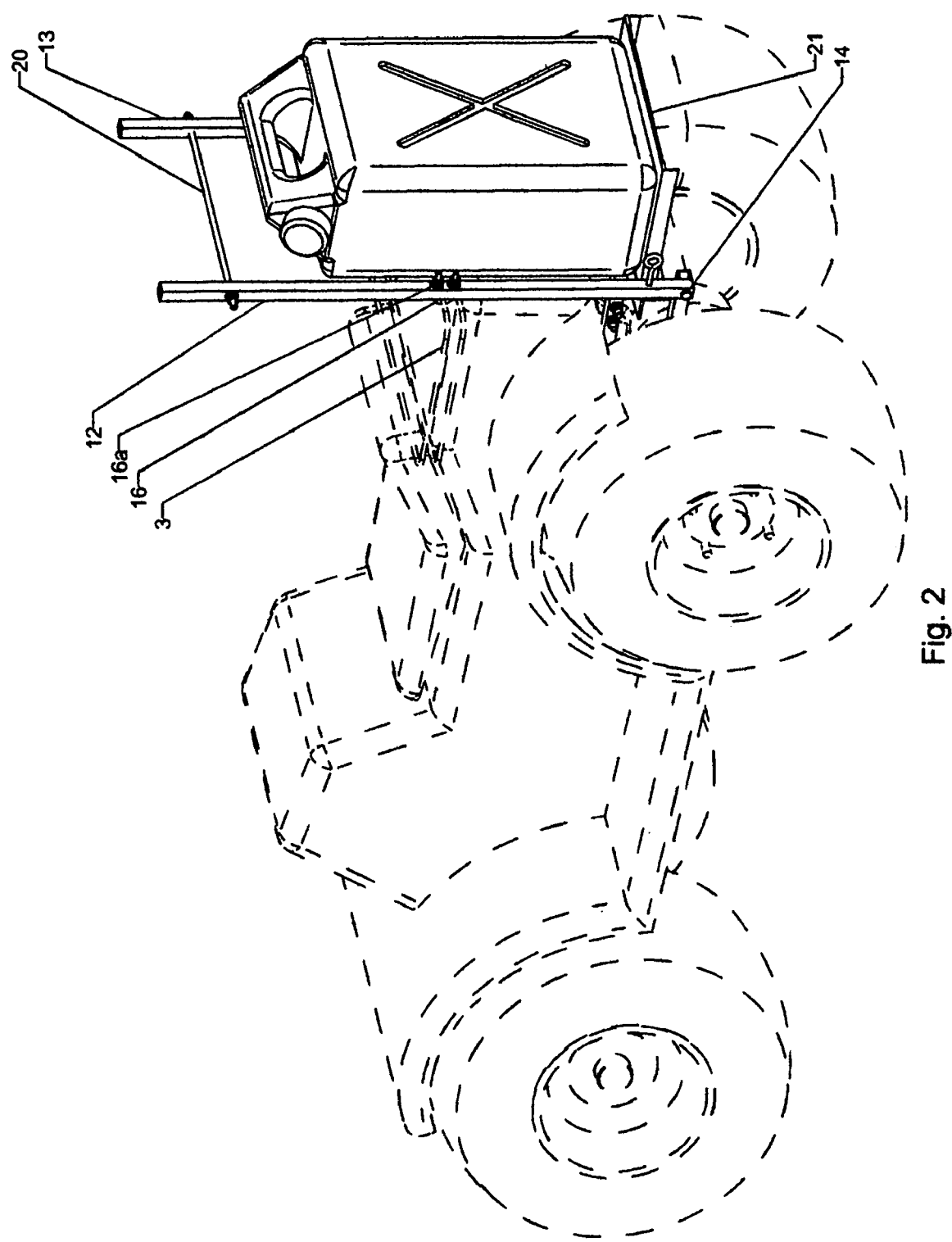
FIG. 2 shows a platform attached to the accessory.

FIG. 2 shows an additional element that is added to the bottom of the upstanding columns 12 an 13 in the form of a platform 21 that can receive items in the form of gas cans, ice boxes or a person standing thereon. The same reference characters are used that were displayed in FIG. 1.

Figure 3:
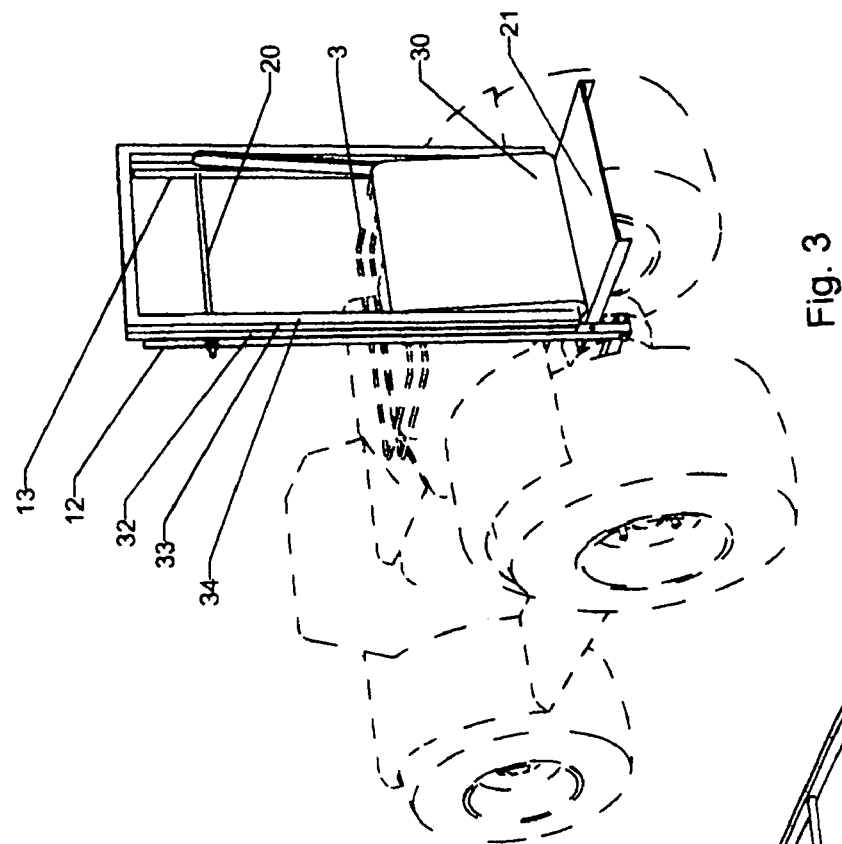
FIG. 3 shows an extendible hunter's stand attached to the ATV.

FIG. 3 illustrates a different embodiment in that this accessory represents a climber stand accessory. The climber stand consists of at least three different sections 32, 33, and 34 that can be assembled together, one upon the other one to end up as an assembled climber. The top may include thereon a horizontal platform when fully assembled. FIG. 3 shows the climbing stand in a disassembled position whereby the individual segments are supported on the horizontal platform 21. The individual segments 32, 33, 34 and 30 may be held against the upstanding columns 12 and 13 by way of a rope, wire or a bungi-cord.

Figure 4:
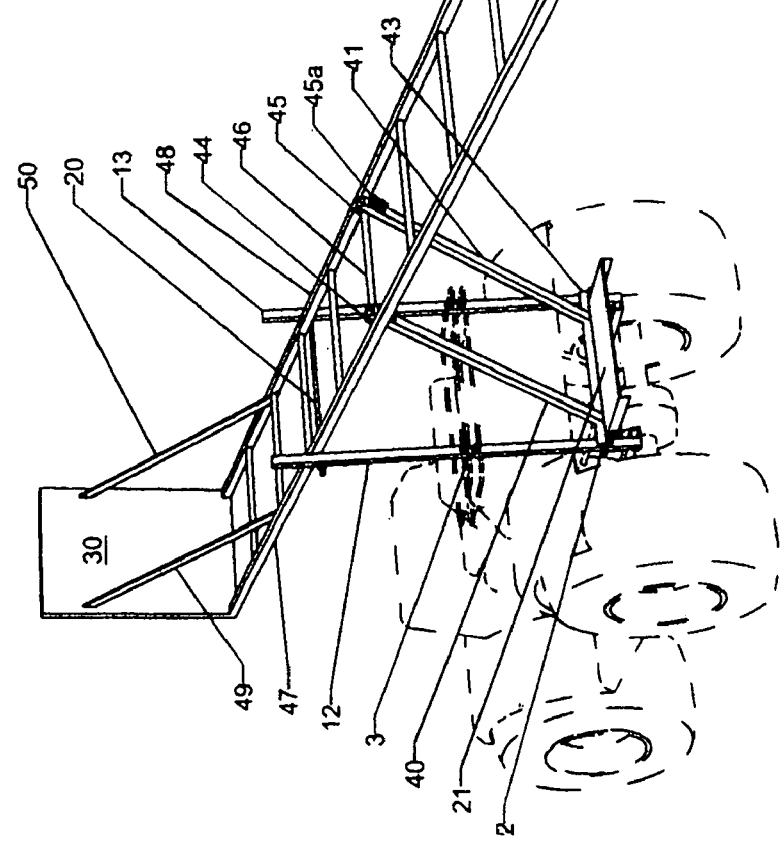
FIG. 4 illustrates an extension ladder attached to the ATV

FIG. 4 illustrates a third embodiment that represents a ladder stand. which may be used for an observation of wildlife stand when fully deployed. As is shown in this FIG. 4, the ladder stand is carried on the ATV in a horizontal position so that when in transport overhanging or low hanging obstructions are avoided. The ladder consists of the ladder support sides 47 and 48 having the various rungs 46 there between. At the top of the ladder stand there is located an upper stand platform 30 which is supported by the reinforcing braces 49 and 50. When in transport, the ladder is resting on the connecting screw element 20 and may be fastened there by way bungi-cords. another segment of the ladder are supported by the braces 40 and 41 which are pivoted at the platform 21 at 42 and 43. The braces 40 and 41 are also connected to the ladder rung 46 on temporary basis while in transport. The connection at the rung 46 is accomplished by U-bolts 44 and 45 having wing nuts 45a thereon for an easy manipulation when taking the ladder off the ATV.

What we claim is:

1. An accessory support structure adapted to be installed on the rear end of an ATV, said ATV having a grid-like horizontal shelf extending crosswise across said ATV, said horizontal shelf having lower support rods extending downwardly into a chassis of said ATV and fastened thereto, said accessory support structure including two vertical upstanding support columns which are fastened to a forward edge of said horizontal shelf and at their lower ends are each fastened to said lower support rods of said shelf by way of horizontal braces being fastened at one of their ends to each of said vertical support columns and at their other ends are fastened to said lower support rods of said shelf, said lower ends of said vertical support columns having a forwardly extending support platform attached thereto to carry items placed thereon, a threaded screw extending between the two vertical support columns proximate an upper end thereof being capable of adjusting the distance between said vertical support columns, wherein an accessory carried by said ATV is an elongated ladder stand having lateral side bars, said ladder stand is carried in a horizontal position on said ATV when not in use and supported by said threaded screw proximate one end of said ladder stand and being supported by braces approximate another end of said ladder stand.

2. The accessory support structure of claim 1, wherein said braces support said ladder stand at an upper end by way of U-bolts fastened to a rung of said ladder.

3. The accessory support structure of claim 2 including a platform attached to an upper end of said ladder stand, said platform will be in a horizontal position when said ladder stand is fully employed.

4. The accessory support structure of claim 3 including at least two braces attached to said platform and to said lateral side bars of said ladder stand to reinforce said platform.

* * * * *